May 5, 1964 E. L. SHERROD Re. 25,568

PUMP FOR SEMI-FLUID MATERIAL

Original Filed July 10, 1961 10 Sheets-Sheet 1

Inventor
Eugene L. Sherrod
By [illegible] Jones
Attorney

PUMP FOR SEMI-FLUID MATERIAL

Original Filed July 10, 1961 10 Sheets-Sheet 2

Inventor
Eugene L. Sherrod
By Dudley Jones
Attorney

PUMP FOR SEMI-FLUID MATERIAL

Original Filed July 10, 1961 10 Sheets-Sheet 3

Inventor
Eugene L. Sherrod
By Geo. Miller Jones
Attorney

PUMP FOR SEMI-FLUID MATERIAL

Original Filed July 10, 1961 10 Sheets-Sheet 4

Inventor
Eugene L. Sherrod
By [illegible]
Attorney

PUMP FOR SEMI-FLUID MATERIAL

Original Filed July 10, 1961 10 Sheets-Sheet 5

Inventor
Eugene L. Sherrod
By Fred Wilton Jones
Attorney

PUMP FOR SEMI-FLUID MATERIAL
Original Filed July 10, 1961 10 Sheets-Sheet 6
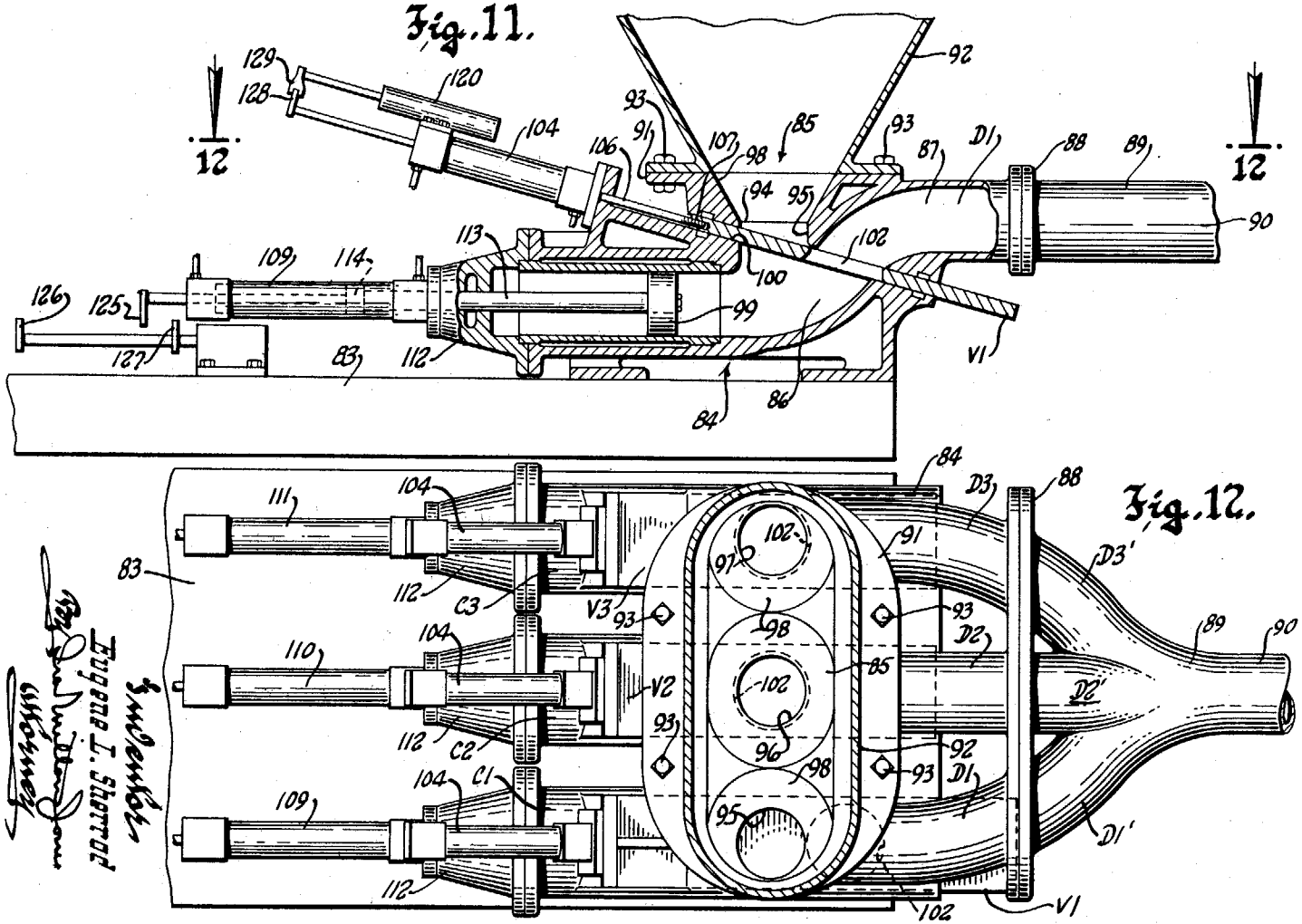
Inventor
Eugene L. Sherrod
By [illegible]
Attorney

PUMP FOR SEMI-FLUID MATERIAL

Original Filed July 10, 1961 10 Sheets-Sheet 7

Inventor
Eugene L. Sherrod
By Dick Hyllton Jones
Attorney

PUMP FOR SEMI-FLUID MATERIAL

Original Filed July 10, 1961 10 Sheets-Sheet 8

Inventor
Eugene L. Sherrod
By
Attorney

PUMP FOR SEMI-FLUID MATERIAL

Original Filed July 10, 1961 10 Sheets-Sheet 9

Inventor
Eugene L. Sherrod
By Dick Mullen Jones
Attorney

PUMP FOR SEMI-FLUID MATERIAL

Original Filed July 10, 1961 10 Sheets-Sheet 10

Inventor
Eugene L. Sherrod
By
Attorney

United States Patent Office

Re. 25,568
Reissued May 5, 1964

25,568
PUMP FOR SEMI-FLUID MATERIAL

Eugene L. Sherrod, 105 Leanore Lane, Brookfield, Wis., assignor of one-half to Robert T. Sherrod, Milwaukee, Wis.

Original No. 3,068,806, dated Dec. 18, 1962, Ser. No. 122,925, July 10, 1961. Application for reissue Apr. 2, 1963, Ser. No. 270,513
19 Claims. (Cl. 103—169)

Matter enclosed in heavy brackets [ ] appears in the original patent but forms no part of this reissue specification; matter printed in italics indicates the additions made by reissue.

This invention relates to apparatus for pumping semi-liquid materials, such as freshly mixed concrete and other materials having comparable consistency and resistance to free and even flow, and it has more particular reference to positive displacement pumps of the reciprocating piston type.

The main objectives of this invention are the same as those set forth in my co-pending application Serial No. 810,619, filed May 4, 1959, and of which this application is a continuation-in-part.

In general, the purpose of this invention is to make possible substantial increases in the output rates of reciprocating piston type pumps for handling concrete and other semi-liquid slow flowing materials.

Experience has shown that certain design requirements are essential to the successful operation of positive displacement reciprocating piston type concrete pumps. For example, it is well established that: it is impracticable to provide such a pump with more than one pipeline into which the pump discharges; the individual diameters of the pump cylinders and each of their intake and discharge ports and/or passages must be approximately equal to the diameter of the single pipeline; and the pump must be operated to effect discharge of only one pump cylinder at a time into the single pipe line of the pump.

To meet these requirements, and particularly the last of those set forth above, successful concrete pumps heretofore available were never provided with more than two cylinders, each wtih a piston reciprocable therein, and caused to alternately discharge into the pipeline on the forward strokes of their pistons and to take in a new charge on the return or rearward strokes of their pistons. In such a pump, therefore, each cylinder in turn is caused to discharge, while the other is charging and the rate at which concrete can be charged into the cylinders to fill the same under the combined effects of gravity and suction during the return strokes of the pistons then becomes the factor which determines the output rate of the pump.

Due to the poor flow characteristics of semi-liquid materials such as freshly mixed concrete, the pistons of a pump handling such materials were limited to a rate of reciprocation which was slow enough to assure substantially full charging of their cylinders under the combined effects of gravity feed and suction developed by the pistons on their return strokes. In other words, the speed of piston reciprocation could not be increased in an effort to achieve a greater output rate without seriously reducing the charge brought into the pump cylinders on the return strokes of their pistons.

With these problems in mind, it is the main objective of this invention to provide a reciprocating piston pump for plastic or semi-liquid materials such as freshly mixed concrete, wherein the output of the pump is very materially increased and in nowise limited by the reluctance of the material being pumped to flow into the pump cylinders during the return or charging strokes of their pistons.

More specifically, it is the purpose of this invention to provide a reciprocating piston type pump for freshly mixed concrete or other materials of comparable consistency, wherein the output rate of the pump can exceed the charging rate of each pump cylinder by two or more times.

In accordance with the aforementioned objectives, it is a still more specific purpose of this invention to provide a reciprocating piston concrete pump of the character described with drive means that effects travel of the pump pistons at charging rates different from their discharging rates, but which pump nevertheless effects a smooth and continuous discharge of concrete, and conforms with the above mentioned requirements that the pump discharge into a single pipeline, that the diameters of the pump cylinders and its intake and discharge ports be substantially equal to the diameter of the pipeline, and that only one cylinder at a time discharge into the pipeline.

A further specific objective of this invention is to provide a multi-cylinder pump of the character described, which departs radically from the prior pumps of this character in that it [is] *may be* comprised of three or more cylinders, the pistons of which [are] *can be* driven at rates so related that the time interval required to move each piston through a full discharging stroke is substantially equal to the time interval required to move said piston through a full charging stroke divided by one less than the number of cylinders of which the pump is comprised; and wherein piston travel is so synchronized as to produce forward or discharge movement of each piston in turn while concomitantly producing slower rearward or charging movement of [the] *two or more* remaining pistons through different fractions of their charging strokes.

In a three cylinder pump of this invention, for example, different combinations of two pump cylinders [will] *can* at all times be charging as a consequence of retraction of the pistons therein at an optimum slow rate and through different fractions of their retraction strokes. Thus, about twice as much material [will] *can* be charged into the pump per unit of time than was possible heretofore with two cylinder pumps, and up to twice as much material [will] *can* be discharged from the pump to approximately double its output as each piston in turn is propelled along its discharging stroke at a rate which is equal to twice that of the pistons on their charging strokes.

Another object of this invention is to provide a multi-cylinder positive displacement reciprocating piston concrete pump of the character described with unique intake and discharge valve means for the cylinders.

In this respect, it is a more specific object of the invention to provide means for synchronizing the opening and closing of the intake and discharge valve means with piston travel so that the discharge port of each cylinder in turn will be open during the interval required to move its piston through its discharge stroke, while the intake ports of the cylinders will be open during the charging strokes of their respective pistons.

A further object of this invention resides in the provision of a multi-cylinder positive displacement pump of the character described, wherein the pistons of the pump are driven in the manner described by fluid pressure operated mechanisms.

With the above and other objects in view which will appear as the description proceeds, this invention resides in the novel construction, combination and arrangement of parts substantially as hereinafter described and more particularly defined by the appended claims, it being understood that such changes in the precise embodiment of the herein-disclosed invention may be made as come within the scope of the claims.

The accompanying drawings illustrate three complete examples of the physical embodiments of the invention constructed according to the best modes so far devised for the practical application of the principles thereof, and in which:

FIGURE 11 is a view partly in side elevation and partly in longitudinal section, of a modified embodiment of the invention wherein the pump pistons and the inlet and outlet valve mechanisms are actuated by hydraulic cylinders:

FIGURE 12 is a view looking downwardly along the line 12—12 of FIGURE 11;

Figure 13:
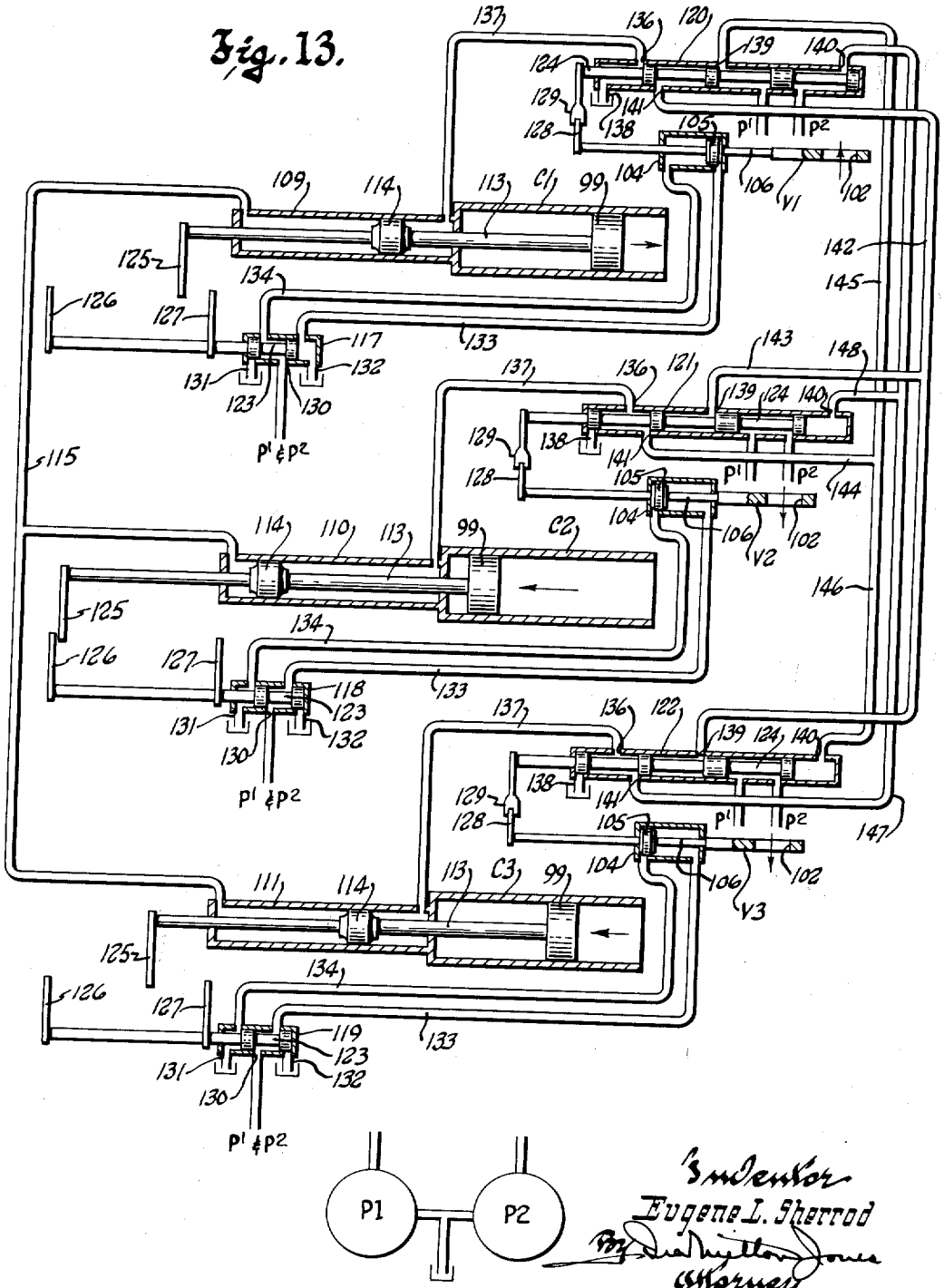
Figure 14:
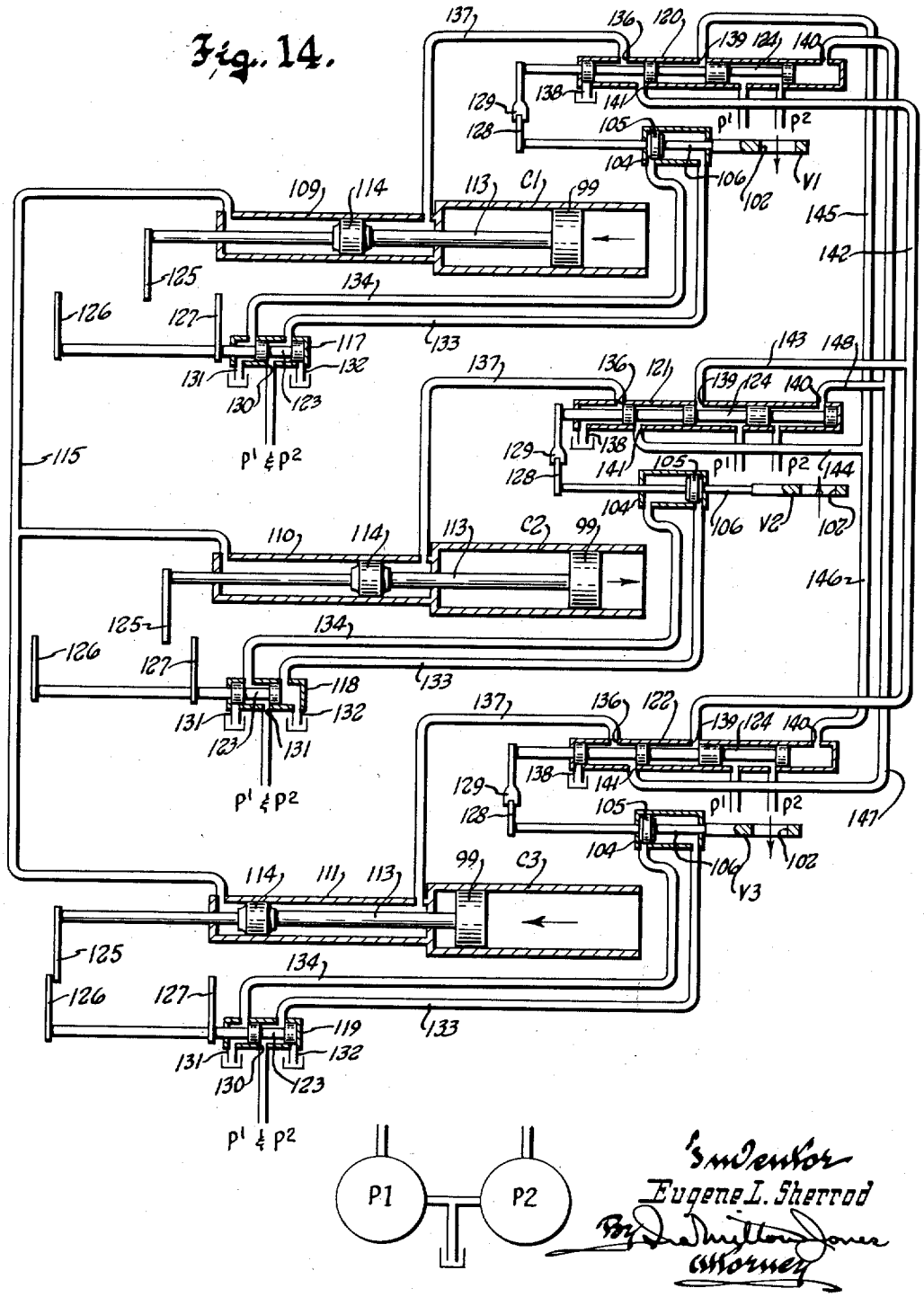
Figure 15:
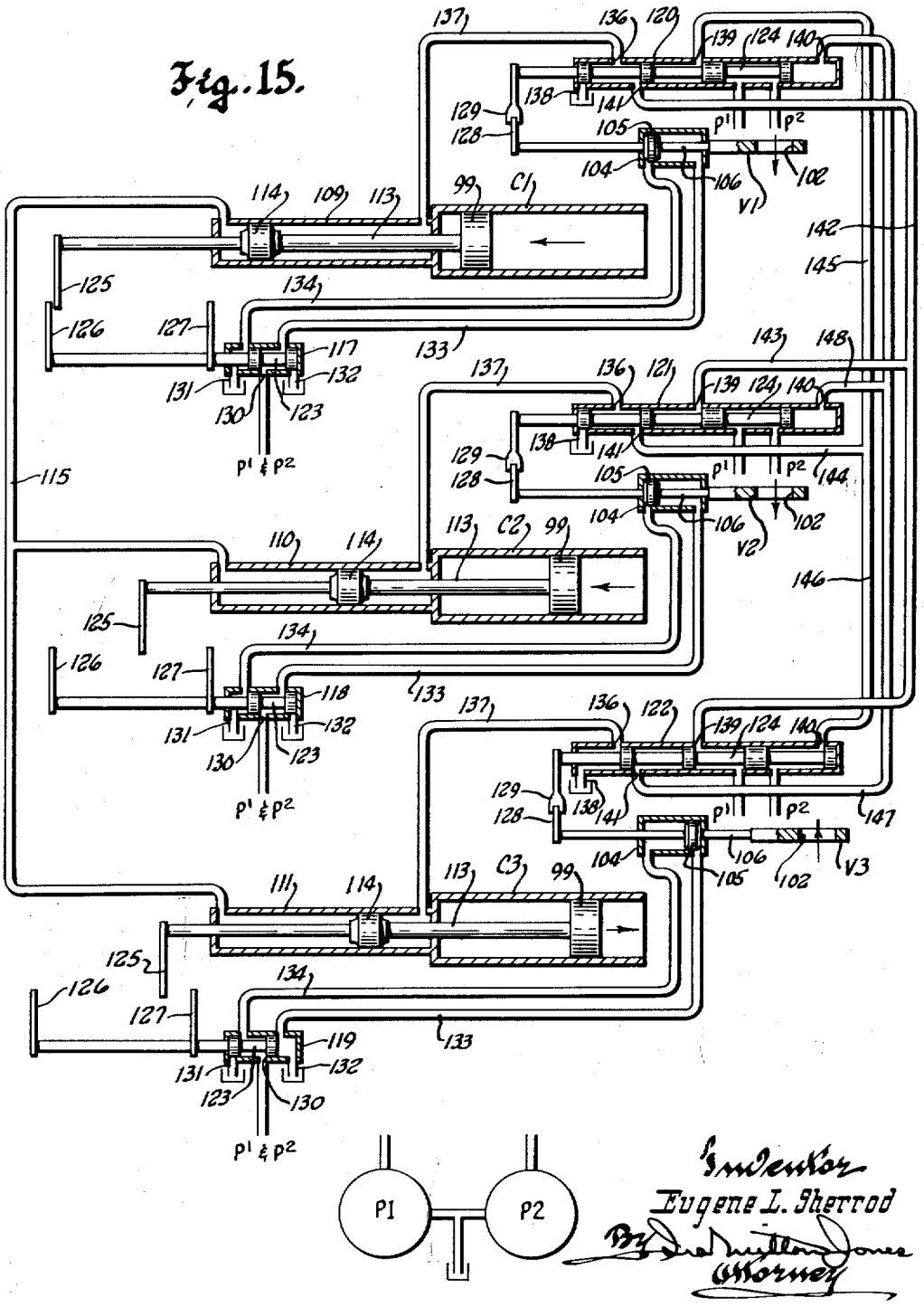
Figure 16:
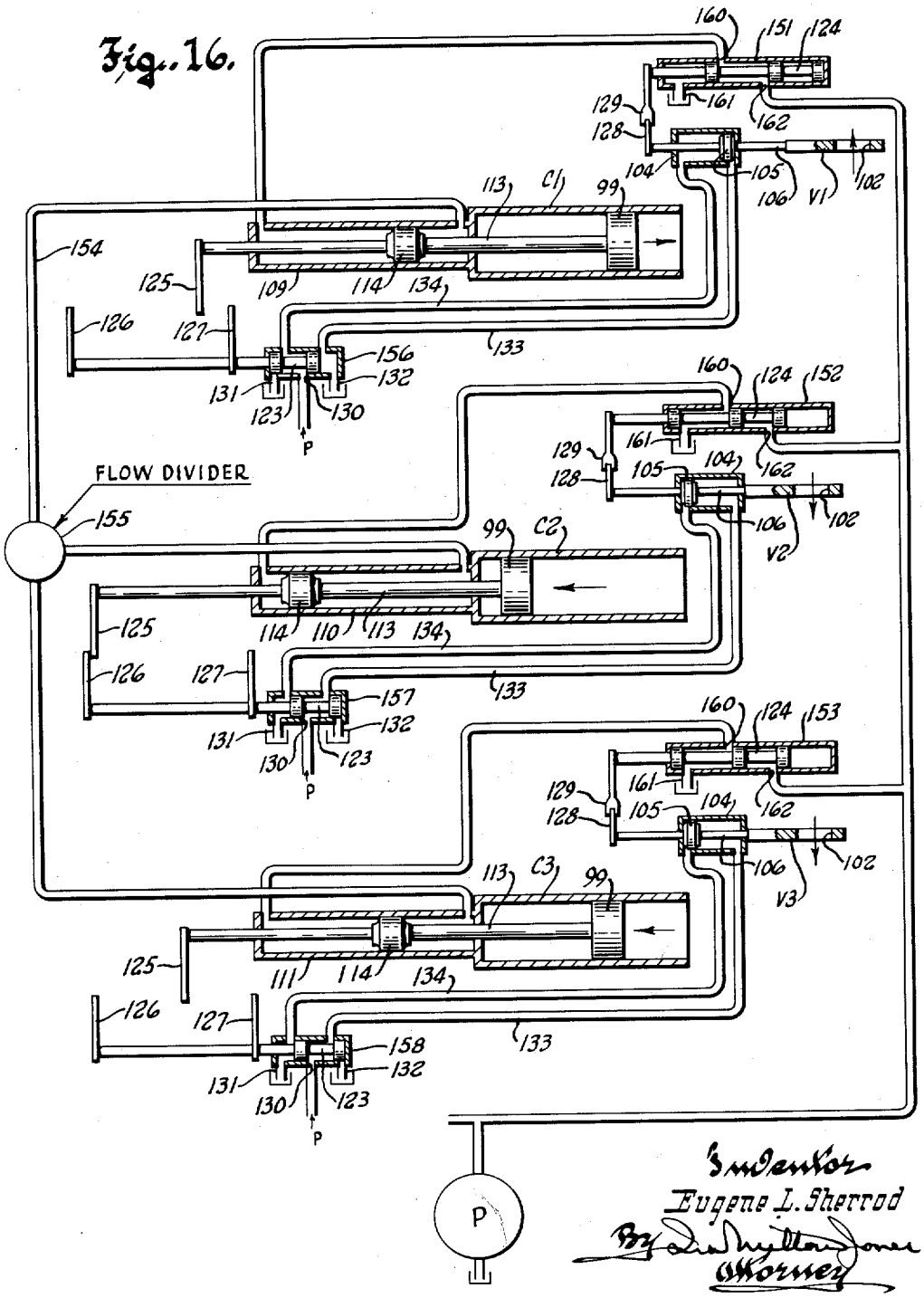

FIGURES 13, 14, and 15 are hydraulic diagrams illustrating a full cycle of operation of the pump of FIGURE 11; and FIGURE 16 is a hydraulic diagram illustrating a further modification of the invention.

Referring now more particularly to the accompanying drawings, wherein like reference characters have been applied to like parts throughout the views, the numeral 15 generally designates a horizontally elongated casing which houses the components of the pump of this invention. Concrete or other material to be pumped is fed into a charging hopper 16 mounted on the casing directly over a pumping head 17 in the front portion of the casing. The concrete fed into the charging hopper flows out of its bottom and into a receiving chamber 18 in the upper portion of the head 17, disposed on a vertical axis.

In accordance with the principles of this invention, [the pump] *a pump having an output capacity substantially double that of conventional two cylinder pumps* must comprise at least three pumping cylinders. For the sake of simplicity, the minimum number of three such cylinders C1, C2, and C3 has been shown as incorporated in the pump head 17, beneath the receiving chamber 18. Each of the cylinders is provided by a sleeve having a substantially closed rear portion 19 projecting from the head 17 and supported by a transversely extending plate 22 fixed inside the casing a short distance rearwardly of the head.

While the orientation of the cylinders is in nowise critical to this invention, they have here been shown by way of example as being mounted horizontally in the head with their axes parallel and extending longitudinally of the casing. In addition, the cylinders C1 and C2 have been shown with their axes disposed in a common horizontal plane and beneath the cylinder C3, with the latter centered with respect to the two cylinders thereunder.

Concrete or other material to be pumped is conducted to the cylinders C1, C2 and C3 through feed passages 23, 24 and 25, respectively, there being one such feed passage for each cylinder extending upwardly from an inlet port 26 in an upper side of the cylinder defining sleeves and opening through the bottom 20 of a circular well 21 formed in the receiving chamber 18 at its bottom. In the arrangement shown, the ports 26 for the cylinders C1 and C2 open through their respective sleeves near the forward ends of the latter, while the port 26 for the remaining cylinder C3 opens through the sleeve defining that cylinder near the mid-portion of the sleeve. Preferably, the upper ends of the feed passages open through the bottom 20 of the well 21 in the receiving chamber at locations equispaced from one another and from the axis of the well. Hence, those portions of the cylinder defining sleeves which extend forwardly of the inlet ports 26 in effect provide discharge passages for the cylinders.

The forward ends of the sleeves that define the cylinders are open and provide discharge ports 28, all of which communicate with a common discharge or collecting chamber 29 that is provided by a forwardly convergent outlet nozzle 30. The nozzle 30 is secured by screws 31 to the front of the head 17 with its larger end portion overlying a shallow forwardly opening well 32 in the head. The well is cylindrical and its axis is disposed horizontally and parallel to the axis of the cylinders, centrally of their discharge ports 28. The bottom 33 of the well is flat and normal to the well axis, and the forward ends of the cylinder sleeves are shown terminating flush therewith, at locations equidistant from one another and from the axis of the well 32.

It should be appreciated that in cases where it may be desirable to orient the pumping cylinders in arrangements other than that shown, extended and/or curved discharge passages may be provided to communicate the cylinders with the outlet nozzle. In that case, with the apparatus under consideration, the forward ends of such discharge passages should open to the well 32 in the same relationship to its bottom as the ports 28.

The smaller diameter forward end of the outlet nozzle 30 is adapted to be connected to a pipeline, such as indicated at 34, through which concrete or other material issuing from the pump can be conducted to a point of use remote from the pump.

As stated previously, there is nothing critical about the disposition of the cylinders, but it is desirable to have their feed passages 23, 24, and 25 extend downwardly to their inlet ports, from the well 21 in the receiving chamber 18. In this respect, gravity is relied upon, at least in part, to effect charging of the pump cylinders. It is important, however, that each of the feed passages 23, 24, and 25, and each of the cylinder ports 26 and 28 and/or discharge passages which lead to the collecting chamber 29, and in the present case comprise the forward end portions of the cylinder defining sleeves, be of approximately the same diameter as the cylinders. Likewise, it is important that the forward end of the outlet nozzle, as well as the pipeline 34, be of substantially the same diameter as the pumping cylinders. It is well established that the foregoing proportions must be maintained in any concrete pump if it is to operate satisfactorily.

In accordance with this invention, freshly mixed concrete or other materials having comparable slow-flow characteristics, is simultaneously charged into different combinations of two cylinders from the receiving chamber 18, and concurrently discharged from the remaining cylinder. For this purpose, the flow of material into the cylinders is controlled by a valve mechanism comprising a sector-shaped inlet valve 36 rotatably received in the well 21 in the bottom of the receiving chamber, and the discharge of material from the cylinders is controlled by valve mechanism comprising a similar sector-shaped outlet valve 37 which is rotatably received in the well 32 at the front of the pump head.

Though both valves 36 and 37 have been shown as thin discs of sector-shape, certain advantages result if they are given a shallow conical shape, with the conical surface of the inlet valve at its bottom and fitting in a conical well at the bottom of the receiving chamber, and the conical surface of the outlet valve facing forwardly.

Figure 1:
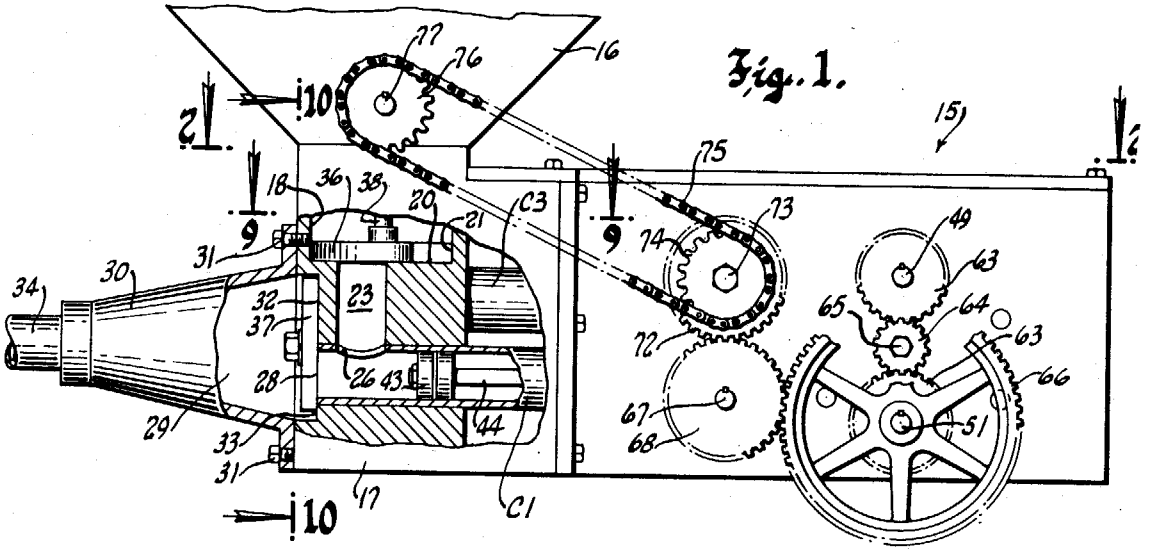
FIGURE 1 is a side elevational view of a three cylinder concrete pump embodying this invention, parts thereof being broken away to show one of the pump pistons at the mid-point of its discharging stroke.
Figure 9:
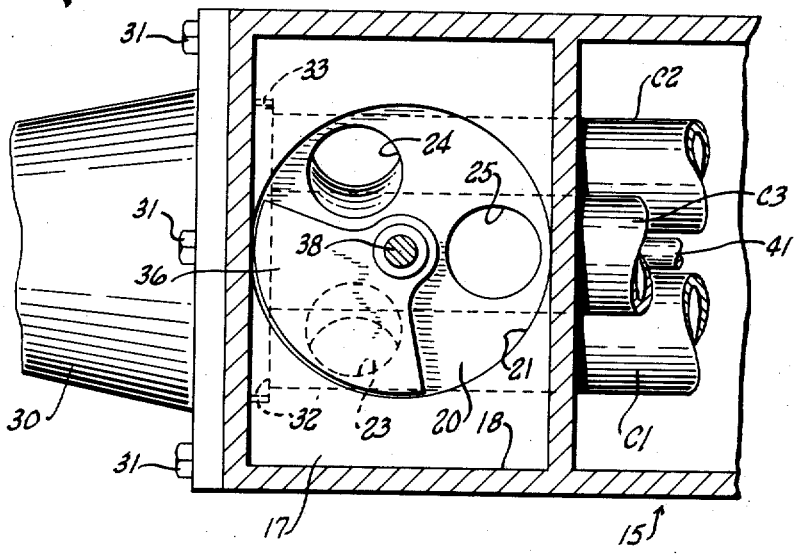
FIGURE 9 is a horizontal sectional view taken on the line 9—9 of FIGURE 1, and showing the inlet valve arrangement.

The sector-like shape of the inlet valve 36 is best seen in FIGURE 9, and it has such angular magnitude that it is operable to close the entrance to one of the feed passages while leaving the other two open. It is thus able to block communication between the source of material to be pumped and any cylinder from which material is discharging, while allowing material to be charged into the remaining cylinders. By way of example, FIGURE 1 shows the piston 43 in cylinder C1 about midway through its forward or discharging stroke, during which the entrance to the feed passage 23 for that cylinder should be closed by the valve, as shown in FIGURE 9, while material may be charged into cylinders C2 and C3 through open feed passages 24 and 25.

The inlet valve is mounted in the receiving chamber 18, in flatwise engagement with the bottom 20 thereof, for rotation on the vertical axis of the chamber, and so as to travel edgewise with little or no resistance through material passing downwardly from the chamber into the feed passages 23, 24, and 25. For this purpose, the valve is secured to the lower end of a shaft 38 which is journalled in the hub 39 of a spider 40 fixed to the wall of the receiving chamber near the top thereof, for rotation on the axis of the receiving chamber. Consequently, upon clockwise rotation of the inlet valve by its drive shaft 38, through an angle of 120° from its position seen in FIGURE 9, the valve will be shifted from its position closing the entrance to feed passage 23 and will then close the entrance to feed passage 24 of cylinder C2, leaving feed passages 23 and 25 open for charging of material into cylinders C1 and C3. Upon rotation of the valve through an angle of 240° from its position seen in FIGURE 9, the valve will close the entrance to feed passage 25 and leave the passages 23 and 24 open for charging of material into cylinders C1 and C2. Obviously, after rotation through an angle of 360°, the valve will be returned to its position seen in FIGURE 9.

Figure 10:
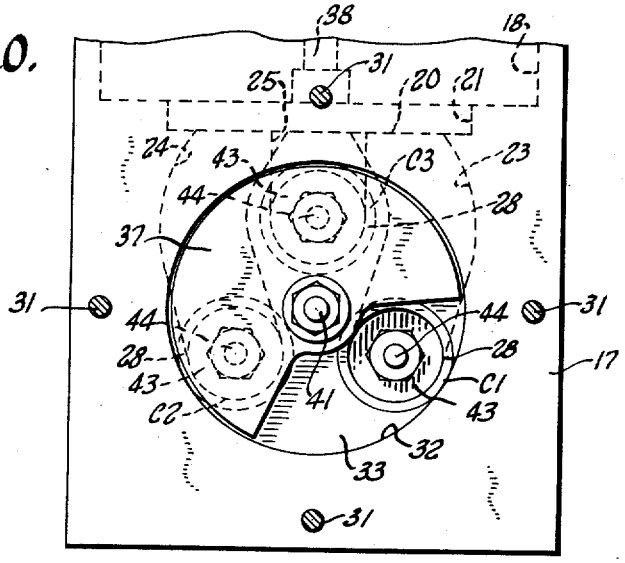
FIGURE 10 is a view taken on the line 10—10 of FIGURE 1, and showing the outlet valve arrangement.

The discharge or outlet valve 37, as viewed in FIGURE 10, likewise has a sector-like shape but it has such angular magnitude that it is operable to simultaneously close the discharge ports of all of the cylinders which are being charged, and to leave open the discharge port of the single cylinder from which material is being expelled. It seats flatwise against the bottom 33 of the well 32 in the front of the head 17, and is fixed to the forward end of a drive shaft 41 that is journalled in the head for rotation on a horizontal axis disposed centrally of, and hence equidistant from the cylinder discharge ports 28.

The discharge valve 37 should be in a position of rotation at which it closes the discharge ports 28 of the two charging cylinders C2 and C3 (FIGURE 10) during the discharge stroke of the piston in cylinder C1 (FIGURE 1), at which time the inlet valve 36 is in its position closing the feed passage 23 for cylinder C1 and the feed passages for cylinders C2 and C3 are open (FIGURE 9).

As will be brought out hereinafter, the outlet valve is advanced in a clockwise direction by its drive shaft 41 (FIGURE 10), in unison with the advance of the inlet valve. Hence, the discharge valve opens the discharge port for cylinder C2 concurrently with closure of the feed passage 24 of that cylinder by the inlet valve, and opens discharge port for cylinder C3 concurrently with closure of the feed passage 25 for that cylinder by the inlet valve.

Each of the pumping cylinders C1, C2, and C3, of course, contains a reciprocable piston 43. Piston rods 44 affixed to the pistons extend horizontally rearwardly from their cylinders, through the plate 22, and into the space within the rear portion of the casing 15.

Drive means 46, contained within the rear portion of the casing, is provided to reciprocate the pistons in accordance with the principles of this invention, namely to drive each piston in turn through its forward or material discharging stroke while concurrently driving the remaining pistons rearwardly through their charging strokes but at different stages or fractions of said charging strokes.

As will be appreciated by those skilled in the art, many different types of mechanical or hydraulic drive instrumentalities can be provided for that purpose, as long as they are capable of moving each piston in turn through its discharging stroke at an average speed that is approximately equal to the average speed at which the piston is moved through its charging stroke multiplied by one less than the number of pumping cylinders incorporated in the pump. Stated in another way, the pistons must be so reciprocated that the travel time of a piston discharge stroke must be approximately equal to the travel time of a piston charging stroke divided by one less than the number of pumping cylinders of which the pump is comprised.

The piston drive means 46 shown in FIGURES 1 through 7 constitutes one example of a mechanical drive capable of reciprocating the pistons in the manner described. The drive mechanism comprises an upper bank of forward drive discs 48 fixed on a transverse drive shaft 49, a lower bank of rearward drive discs 50 fixed on a transverse drive shaft 51 beneath the shaft 49, and bars B1, B2, and B3 secured to the rods 44 of the pistons in cylinders C1, C2 and C3, respectively.

The bars B1, B2, and B3 provide elongated rearward extensions of the piston rods, and they are located in horizontal side by side relationship, with the bar B3 slidingly confined between the bars B1 and B2. While the latter two bars are offset upwardly with relation to the rods of the pistons in cylinders C1 and C2, the bar B3 is offset downwardly with respect to the rod of the piston in cylinder C3. All three of the bars, however, extend rearwardly in closely grouped relation, and have rear portions located between the upper and lower banks 48 and 49 of drive discs as seen best in FIGURES 2, 3 and 6.

Sets of rollers 52 carried by the casing, supportingly engage the undersides of all the bars at locations both forwardly and rearwardly of the banks of drive discs, and another set of rollers 53 carried by the casing in position to engage the tops of the bars at locations directly over the rear rollers 52, preclude up and down motion of the bars during the imposition of the forces thereon by which the bars are reciprocated.

There are four forward drive discs 48 in the upper bank, and also four rearward drive discs in the lower bank. These discs are mounted on their shafts 49 and 51 with each of the upper discs 49 in edgewise alignment with one of the lower discs 50, and with the discs in each bank, spaced apart a uniform distance by spacers 54 on their respective shafts.

These spacers position the discs in such relation to the bars B1, B2 and B3 that each of the latter substantially spans the space between an adjacent pair of upper and lower discs. An upper drive lug 55 fixed on the top of each bar projects upwardly into the space between adjacent discs 48 and into the path of travel of diametrically opposite drive pins 56 carried by each pair of upper discs. The upper drive lugs are so positioned lengthwise of their bars as to be transiently engageable at their rear by each of the drive pins 56 during clockwise rotation of the upper bank of discs, during travel of the pins through the lower portions of their orbits, and providing the bars are in their rearward limits of reciprocatory motion, as is the bar B2 in FIGURE 5.

The pins 56 lengthwise span the space between each pair of adjacent upper discs, and each is capable of moving its associated bar in in the forward direction, to effect a discharge stroke of the piston with which it connects, as the pin sweeps through the lower portion of its orbit and engages the rear of the upper lug 55 on the bar therebeneath.

Rearward movements of the pistons in their cylinders to effect the charging strokes thereof is effected by transient engagement between a lower drive lug 57 on each of the bars B1, B2 and B3, and diametrically opposite drive pins 58 carried by each pair of lower drive discs 50. The lower lugs 57 project downwardly into the spaces between adjacent lower discs 50, into the path of travel of the pins 58, and these lugs are so positioned slightly rearwardly of the upper lugs 55 as to be engaged at their fronts by the drive pins 58 during clockwise movement of the pins through the upper portions of their orbits, providing the bars are in their forward limits of reciprocatory motion, as is the bar B1 in FIGURE 3.

Figure 3:
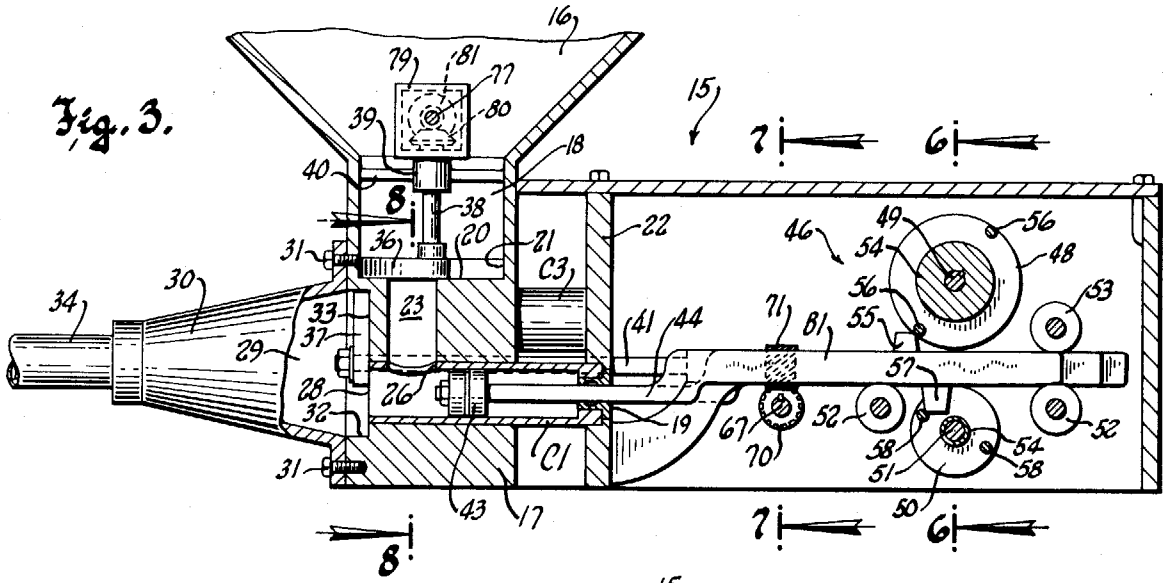
FIGURE 3 is a longitudinal sectional view taken along the line 3—3 of FIGURE 2 and showing the pump piston of FIGURE 1 in its full discharging position.

Referring to FIGURE 3, it will be seen that the drive pins 56 and 58 are so arranged that each of the pins 56 on the upper bank of discs alternates with one of the drive pins 58 on the lower bank of discs to propel bar B1 forwardly in the discharge stroke of its piston, and then rearwardly in the charging stroke of its piston, in consequence of clockwise rotation of shafts 49 and 51 in the clockwise direction and at the same rate of speed. For example, an upper pin 56 is shown leaving engagement with the rear of upper drive leg 55 on bar B1 in FIGURE 3, at the forward limit of travel of the piston in cylinder C1. Substantially directly thereafter, a lower pin 58 will come into engagement with the front of the lower drive lug 57 to effect the return or charging stroke of the piston in cylinder C1, at which time the upper lug will be in position to be engaged by the other one of the upper pins 56, to again effect discharging of cylinder C1, followed by charging thereof as the other one of the lower pins 58 is brought into engagement with the lower lug 57.

It is highly significant to note that with the three cylinder pump illustrated, the upper drive pins 56 are radially spaced from the axis of their shaft 49 a distance that is twice as great as the radial spacing of the lower drive pins 58 from the axis of their shaft 51. Thus, the upper pins 56 are carried through their orbits at a rate of speed that is twice that of the lower pins 58. Consequently, the piston in cylinder C1 will be driven forwardly at approximately twice the rate of speed by pins 56 as it is returned by pins 58.

Obviously, the same differential speed of piston reciprocation could be obtained with a construction wherein the upper and lower drive pins were spaced the same distance from their center of revolution, but in that case, the shaft 51 for the lower pins would be rotated at one half the speed of the shaft 49.

It is also important to note that the pistons 43 of all the cylinders are disposed rearwardly of their inlet ports when the pistons are at their forward limits of travel. This condition is illustrated best in FIGURE 3.

Figure 6:
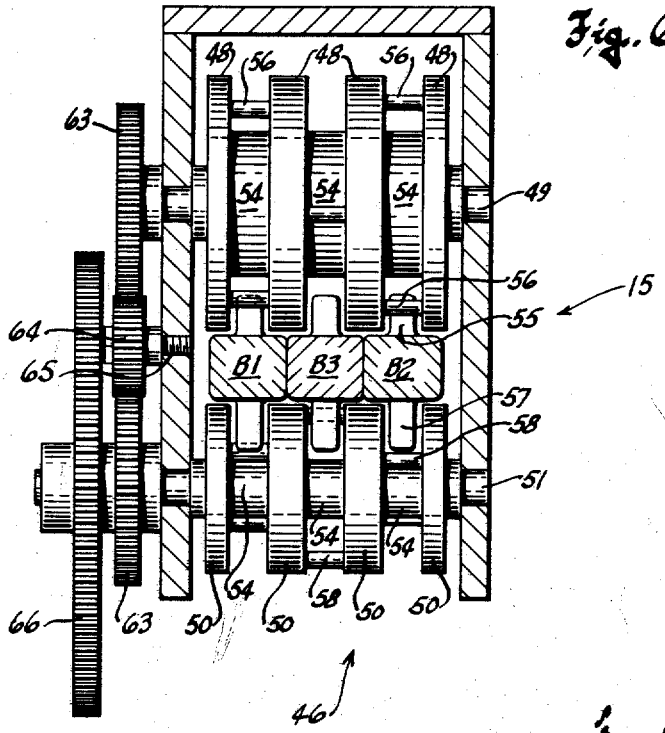
FIGURE 6 is a cross sectional view taken on the line 6—6 of FIGURE 3.
Figure 7:
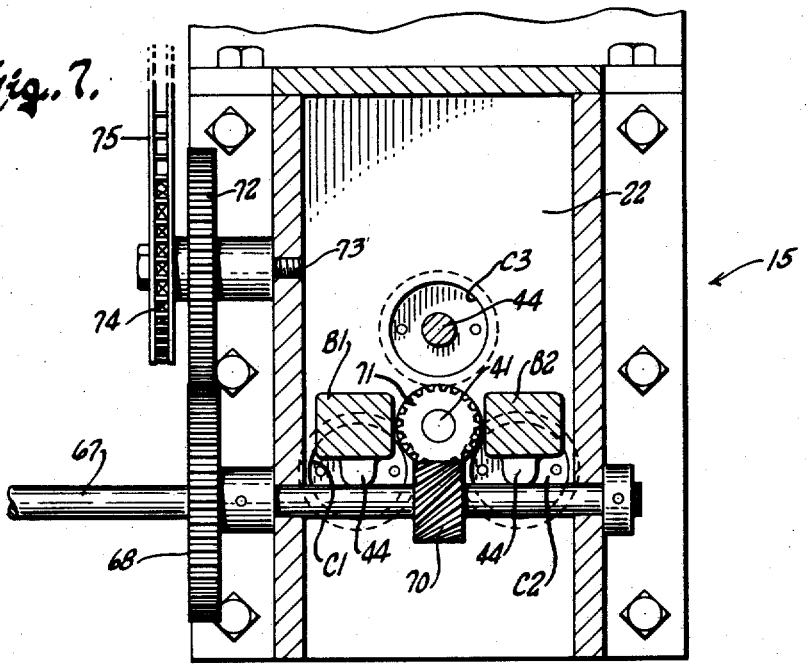
FIGURE 7 is a cross sectional view taken on the line 7—7 of FIGURE 3.
Figure 8:
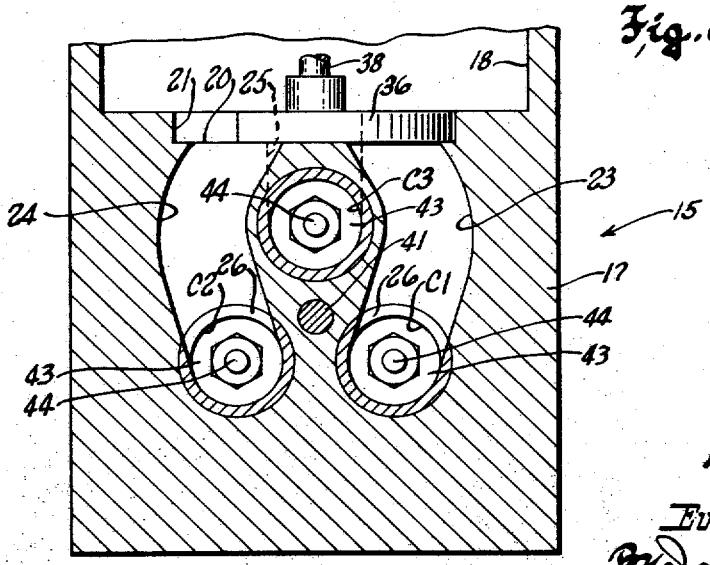
FIGURE 8 is a cross sectional view taken on the line 8—8 of FIGURE 3.

While the drive pins for bar B1 are carried by and span the spaces between the pairs of upper and lower drive discs seen at the left in FIGURE 6, the drive pins for bar B2 are jointly carried by and span the spaces between the upper and lower pairs of drive discs seen at the right in that figure. Similarly, the drive pins for bar B3 are jointly carried by and span the spaces between the pairs of center discs seen in FIGURE 6.

Figure 5:
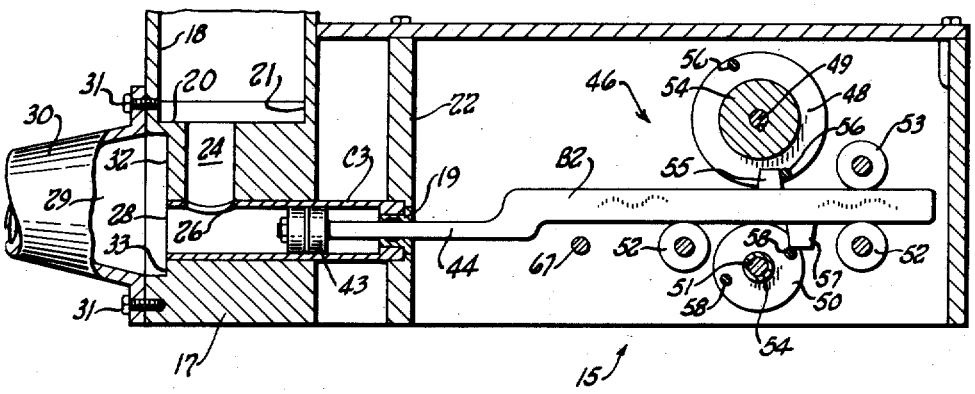
FIGURE 5 is a longitudinal sectional view similar to FIGURE 3, taken along the line 3—5 of FIGURE 2, and showing the third piston of the pump in fully retracted position and about to begin its discharge stroke.

However, it will be noted by reference to FIGURE 5, where bar B2 for cylinder C2 is at its rear limit of travel, that the upper drive pins 56, as well as the lower drive pins 58 therefor, are offset with respect to the drive pins for bar B1 (FIG. 3) by an angular distance of 120° in the clockwise direction. Consequently, at the same time bar B1 is about to begin its return stroke, the upper drive lug 55 of bar B2 is about to be engaged by one of its drive pins 56 for commencement of its forward stroke, while one of the lower drive pins 58 has just passed out of engagement with the lower drive lug 56 on the bar B2.

Figure 4:
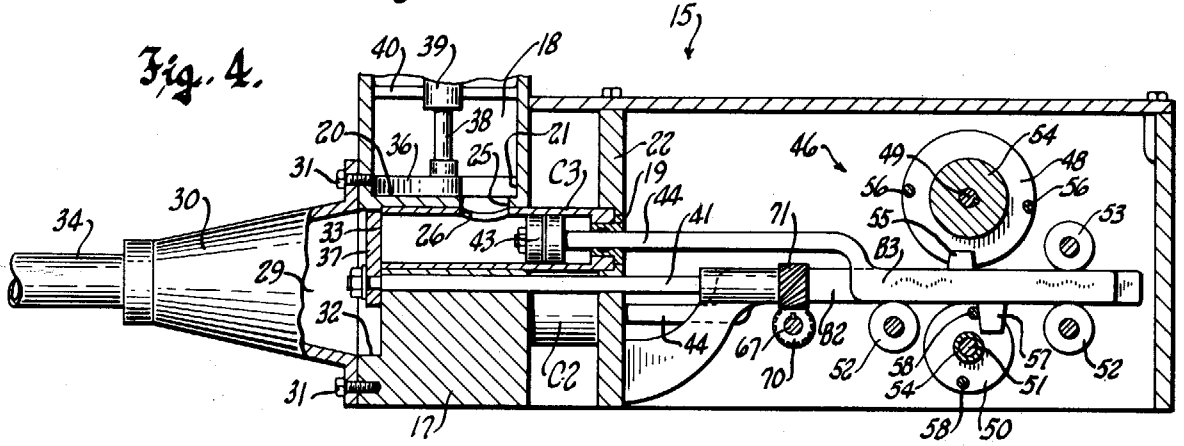
FIGURE 4 is a longitudinal sectional view taken along the line 3—4 of FIGURE 2, and showing a second piston of the pump part way along its retraction stroke.

FIGURE 4 shows the bar B3 about one half way through its return stroke, being propelled rearwardly by one of its lower pins 58, and with the upper and lower drive pin therefor offset from those of the bar B2 by an angular distance of 120° in the clockwise direction.

The shafts 49 and 51 which carry the banks of drive discs 48 and 50 have their opposite end portions journalled in suitable bearings carried by the opposite sides of the casing 15, and both project from the gear side of the casing seen in FIGURE 1, to have identical gears 63 affixed thereto. These gears mesh with a common idler gear 64 that is freely rotatably journalled on a stud 65 in the adjacent side wall of the casing.

The projecting end of the lower shaft 51 also carries a larger gear 66 which is adapted to be driven from a main power shaft 67 carried by the casing for rotation on a transverse axis ahead of the shaft 51. For that purpose, a drive gear 68 is fixed on the power shaft to mesh with the gear 66. The shaft 67, of course, may be connected with a suitable source of driving torque (not shown), and its drive gear 68 is one-half the size of the gear 66 driven thereby, so that the power shaft rotates at twice the speed of the upper and lower banks of drive discs 48 and 50.

The inlet and outlet valves 36 and 37, respectively, are driven in synchronism with piston reciprocation, and this is effected by the transmission of driving torque to their shafts 38 and 41 from the main power shaft 67. For this purpose, the shaft 67 is provided with a helical gear 70 on its mid-portion, beneath the shaft 41 of the outlet valve, which meshes with a similar helical gear 71 on the shaft 41 so as to transmit rotation to the outlet valve at the same speed as the main drive shaft rotates.

The gear 68 on the main drive shaft 67 also meshes with a gear 72 of the same size, which is freely rotatably journalled on a stud 73 secured in the adjacent side wall of the casing. A sprocket 74 is fixed with respect to the gear 72 to rotate about the axis of the stud 73, and an endless chain 75 trained about the sprocket 74 and a similar sprocket 76 of the same size on the projecting end of a transverse shaft 77 which passes over the upper end of the inlet valve shaft 38, provides for the transmission of driving torque from the main drive shaft 67 to the inlet valve.

Figure 2:
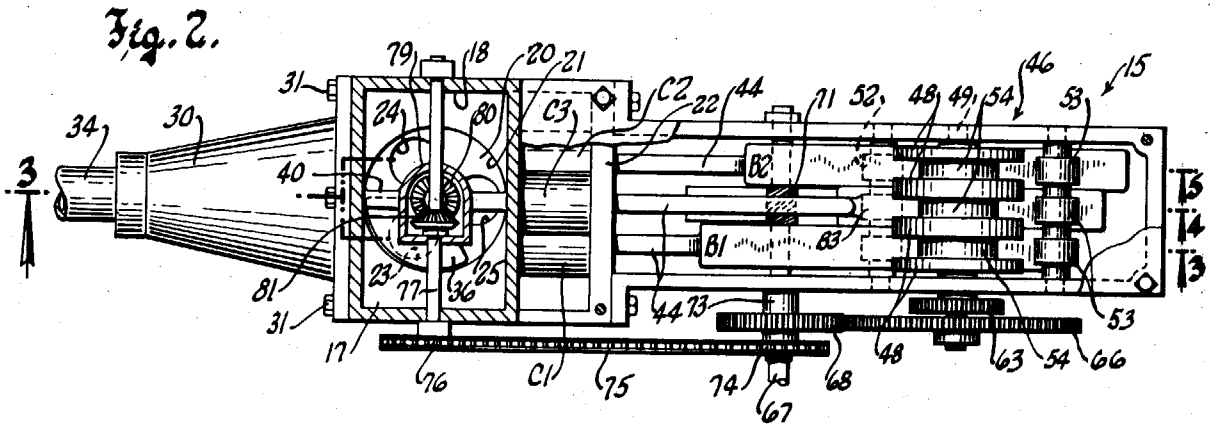
FIGURE 2 is a view of the pump looking downwardly along the line 2—2 of FIGURE 1.

The transverse shaft 77 is journalled in suitable bearings in the opposite sides of the casing 15, and as seen best in FIGURES 2 and 3, passes through a small gear box 79 which is affixed to and supported by the hub 39 of the spider 40 at the top of the receiving chamber 18. The upper end of the shaft 38 of the inlet valve 36 also projects upwardly into the gear box and carries a bevel gear 80 on its extremity, which meshes with a similar bevel gear 81 on the shaft 77.

With the valve rotating mechanism described, both valves will be rotated in unison and will make two complete revolutions for each 360° of rotation of the drive discs. In other words, each valve will be rotated through one complete revolution with each half a revolution of the drive discs, during which one of the pistons will have been advanced through its discharge stroke and retracted through its charging stroke.

During a cycle of rotation of the inlet valve, each of the feed passages 23, 24, and 25 in turn will be closed during the discharge stroke of the pistons in their respective cylinders, while the remaining feed passages will be open to allow material to be charged into the cylinders in which the pistons are being retracted. Likewise, during a cycle of rotation of the outlet valve, each of the outlet ports in turn will be open during the discharge stroke of the piston in the corresponding cylinder, while the remaining outlet ports will be closed to prevent material that has been pumped into the outlet nozzle from backing up into the cylinders that are being charged.

In the three cylinder pump described, each piston in turn will be propelled forwardly in its discharging stroke at a predetermined speed while the remaining two pistons will be propelled rearwardly in their charging strokes, in different phases thereof, but at one-half said predetermined speed. Since the speeds of piston travel may not be precisely uniform, a more accurate way of expressing the above relationship would be by reference to the time intervals during which the pistons are propelled through their charging and discharging strokes. In a three cylinder pump, the time of a piston charging stroke would be substantially equal to twice the time of its discharging stroke; and in a pump having more than three cylinders, the time of and in a pump having more than three cylinders, the time of a piston charging stroke [would] *can* be equal to the time of its discharging stroke multiplied by one less than the number of cylinders incorporated in the pump.

Hence, if the charging strokes of the pistons are timed to assure substantially complete charging of the cylinders, it is theoretically possible for the three cylinder pump described to have twice the output rate of a comparable two cylinder pump. In practice, while the output rate may not be quite double that of a comparable two cylinder pump, it nevertheless represents a tremendous increase in pumping capacity.

A pump made in accordance with this invention may have several more than the three pumping cylinders illustrated, to achieve still greater pumping capacities. In cases where several cylinders are to be embodied in the pump, it may be desirable to orient the cylinders in relationships other than that disclosed, and to provide other forms of edgewise movable inlet and outlet valves for the cylinder ports.

On the other hand, it may be desirable to incorporate as many as five or six cylinders in a pump of this invention that is adapted to handle concrete of the low slump varieties or other materials having exceptionally poor flow characteristics, in order to achieve a high output rate for the pump. In that case, the piston drive instrumentalities [would] *can* be so designed as to also effect forward propulsion of each piston in turn through its discharge stroke and simultaneous rearward propulsion of the remaining pistons in different phases of their charging strokes at a speed equal to that of the discharging stroke divided by one less than the number of cylinders incorporated in the pump, and slow enough to assure substantially complete charging of the cylinders on the return strokes of their pistons. Thus, even though a longer period of time may be required to charge each cylinder, the output rate of the pump may be maintained at a desirably high value due to the greater number of cylinders that [will] *can* always be charging during operation of the pump.

*From the description thus far, it will be appreciated that increases in output capacity result from the fact that the cycle time of the differentially driven piston in each pump cylinder is substantially less than it is in a conventional pump where the pistons are constrained to travel back and forth at the same speed. For example, if the piston of a pump of this invention is retracted at the usual slow rate of speed necessary to assure optimum charging of its cylinder, and is driven forwardly to discharge its cylinder at twice the charging rate, the time of a piston cycle will be twenty-five percent less than is possible with the crank driven piston of a conventional pump. This, of course, enables the piston to be retracted to begin another charging stroke much sooner than in conventional pumps, and can result in a twenty-five percent increase in the output capacity of the cylinder.*

*Thus, wherever continuous discharge characteristics are not a requisite, even a single cylinder pump having its piston differentially driven in accordance with the principles of this invention can be used to advantage for the pumping of slow flowing materials by reason of its higher output capacity. Likewise, there will be instances where a two cylinder pump having differentially driven but alternately discharging pistons can be used to advantage, as long as pulsating discharge is of no consequence.*

*Wherever continuous discharge is desirable,* [It] *it* is essential, of course, that a pump made in accordance with this invention must always comprise at least three pumping cylinders. The advantages of this invention cannot be achieved in a pump having less than three cylinders *if continuous discharge is a requisite.* In a two cylinder pump, for instance, it follows as a matter of course that if a uniform discharging rate is to be achieved, each of the pistons in the two cylinders must travel alternately backwardly and forwardly in their charging and discharging strokes at substantially equal rates. It likewise follows that the pistons of a pump of the character described cannot be driven by cranks or the like, which are utterly incapable of producing the differential speed relationship between the pistons discussed above.

While the apparatus described is illustrative of one form of a mechanically driven pump, FIGURES 11 and 12 show how a pump of this invention can be operated hydraulically. For simplicity of illustration, the pump is here shown comprised of three parallel pumping cylinders C1, C2 and C3, arranged horizontally in a bank, with the cylinders in side-by-side relation on a base 83. The cylinders are provided by sleeve which are confined in a head casting 84, with their forward ends in register with separate discharge passages D1, D2 and D3. These passages extend forwardly, beneath a receiving chamber 85 formed on the upper portion of the head, and then curve upwardly at a forward inclination, as at 86 to continue horizontally forwardly as at 87, but with the two remote passages converging toward the center passage D2. The forward ends of the passages D1, D2 and D3 open through a flange connection 88 into the branches D1′, D2′ and D3′ of a collecting member 89, the branches of which converge inwardly and forwardly into a common discharge duct 90 that may be connected in any suitable manner with a delivery pipe, not shown. The diameters of the passages, of course, are substantially the same as those of the pump cylinders.

The receiving chamber 85 extends transversely across the lower rear ends of the passages D1, D2 and D3, and its upper end is flanged as at 91 to enable a feed hopper 92 to be secured thereto as by bolts 93.

The bottom 94 of the receiving chamber is formed with three feeder passages 95, 96 and 97, respectively, opening downwardly into the lower rear portions of the discharge passages D1, D2 and D3, at locations just ahead of the forward ends of the cylinders C1, C2 and C3, and behind the upwardly inclined portions 86 of the discharge passages. The lower end portions of these feeder passages are substantially the same diameter as the cylinders, but their upper ends are widened, as at 98 to facilitate the flow of material thereinto from the receiving chamber.

Hence, material to be pumped may flow downwardly into the forward end of each cylinder by the combined effects of gravity and suction induced by rearward travel of a piston 99 in the cylinder, providing the discharge passage for that cylinder is closed at that time. Similarly, such material may be expelled from the cylinder and pumped out of the apparatus through its corresponding discharge passage on the forward stroke of its piston, provided communication between the forward end of the cylinder and the receiving chamber is blocked at that time.

Edgewise slidable elongated gate valves, V1, V2, and V3 for the cylinders C1, C2 and C3, respectively, are provided in this case to enable the flow of material to and from the cylinder to be properly controlled. Each of these valves is slidably received in a slot 100 in the head casting formed to dispose the valve with its flat sides in parallel planes that are tilted slightly downwardly and forwardly from horizontal, as best seen in FIGURE 11, and constrain the valve to lengthwise fore and aft reciprocatory motion, with a rear portion of the valve disposed in a feed passage at the bottom of the receiving chamber, and a forward portion of the valve disposed in the adjoining upwardly and forwardly inclined portion 86 of the corresponding discharge passage. Each of the valves V1, V2 and V3 has a single hole 102 through its medial portion, of a size comparable to the diameter of the pump cylinders, which can be brought into register with either the feed passage or the discharge passage of its associated cylinder by shifting of the valve in fore and aft directions. In the forward position of the valve V1 shown in FIGURE 11, its hole 102 registers with the discharge passage D1 while the imperforate rear portion of the valve closes off the feed passage 95 to thus enable material previously charged into cylinder C1 to be pumped out through passage D1 during the forward stroke of the piston 99 in cylinder C1.

When the valve V1 is moved rearwardly to a position such as occupied by valves V2 and V3 in FIGURE 12, its hole 102 will register with the feed passage 95 while its imperforate forward portion closes the passage D1, to thus enable material to be charged into the cylinder C1 through the rear of passage D1 upon the retraction stroke of the piston in cylinder C1.

A double acting hydraulic cylinder 104 is provided for each valve, to slide the same fore and aft to the positions described. Each of these cylinders is mounted on the rear of the pump head, lengthwise behind one of the valves, and has a piston 105 and a piston rod 106 that projects forwardly from the cylinder and is secured to its valve as at 107.

The pistons 99 of the pumping cylinders C1, C2 and C3 are also reciprocated hydraulically, by means of double acting hydraulic cylinders 109, 110 and 111, respectively. A coupling adaptor 112 serves to mount each of the actuating cylinders on the head, in endwise alignment with its pumping cylinder. In this case, it is possible to provide a common piston rod 113 for each pumping cylinder and its actuating cylinder, extending lengthwise through the coupling member 112 with its forward end secured to the piston 99 in the pumping cylinder and its rearward end secured to the piston 114 in the actuating cylinder.

Reference may be had to the hydraulic diagrams shown in FIGURES 13, 14 and 15 for an example of how the pump actuating cylinders 109, 110, and 111, and the valve shifter cylinders 104 may be controlled to effect operation of the pump of FIGURES 11 and 12 in accordance with the principles of this invention. As therein seen, the piston 99 in cylinder C1 is shown close to the end of its discharging stroke, while the pistons 99 in cylinders C2 and C3 are moving rearwardly in their charging strokes, with the piston in cylinder C2 nearing the end of its stroke and that in cylinder C3 only about half way through its charging stroke. Accordingly, the gate valve V1 is in its forward position closing off the feed passage to cylinder C1 and permitting free discharge of material therefrom; while the valves V1 and V2 are in their retracted positions closing the discharge passages for cylinders C1 and C2 and permitting material to be charged into them.

An outstanding feature of the hydraulic system shown is that the rear ends of all of the actuating cylinders 109, 110 and 111 are connected by a duct 115 in what can be considered a closed circuit. Thus, with pump cylinders C2 and C3 being charged, as seen in FIGURE 13, as a consequence of rearward movement of pistons 114 in their actuating cylinders at the same rate of speed, the hydraulic fluid exhausting from the rear of cylinders C2 and C3 is conducted into the rear of cylinder C1, through duct 115, to cause extension of its piston rod 113 and thereby effect the discharge stroke of pump cylinder C1 at a rate substantially twice that at which the pistons in cylinders C2 and C3 are being retracted.

Another unique feature of the hydraulic system illustrated, is that the travel of the pump pistons cannot be reversed at the ends of their strokes until their respective gate valves V1, V2 or V3 have been first shifted to the proper position, namely to allow charging of the associated pumping cylinder if the piston therein has reached the end of its discharging stroke, or to allow discharge of the associated pumping cylinder if the piston therein has reached the end of its charging stroke. For this purpose, the hydraulic system incorporates gate control valves 117, 118 and 119 associated with the cylinders C1, C2 and C3, respectively, and cylinder control valves 120, 121 and 122 associated with the gate valves V1, V2 and V3, respectively.

The gate control valves 117, 118 and 119 have spools 123 that are actuated to each of two operating positions in consequence of back and forth movement of the pump pistons, while the spools 124 in the cylinder control valves 120, 121 and 122 are actuated to each of two operating positions in consequence of back and forth motion of their respective gate valves V1, V2 and V3. Thus, as diagrammatically shown, a driver 125 is connected with the piston of each pump cylinder to move back and forth therewith, and to have transient engagement with one or the other of a pair of abutments 126 and 127 that are fixed with respect to the spool 123 of each of the gate control valves 117, 118 and 119, near the end of each stroke of the pump piston. In like manner, a driver 128 is connected with each of the gate valves to move back and forth therewith, but the drivers 128 are here shown at all times engaged between and drivingly connected with jaws 129 that are fixed with respect to the spools of the cylinder control valves 120, 121 and 122.

Each of the gate control valves 117, 118 and 119 has a central supply port 130 which connects with the outlets of two pumps P1 and P2, having equal output rates, and reservoir ports 131 and 132 at its opposite ends. Ducts 133 and 134 which connect with the opposite ends of each gate actuating cylinder 104 communicate with its associated control valve at locations at opposite sides of the supply port 130, and between the latter and each reservoir port.

Hence, in one position of the spool 123 of each of the gate control valves 117, 118 and 119, as when the spool has been shifted to the left by completion of a charging stroke of its associated pump piston (see valve 117) its two lands direct incoming hydraulic fluid through duct 134 to the rear of the associated gate actuating cylinder 104, to cause extension of the gate to its discharging position. Fluid exhausting into duct 133 from the front of cylinder 104 during such extension of the gate valve, is led through its gate control valve to the reservoir port 132. In like manner, when the spools 123 of the gate control valves have been shifted to the right by completion of a discharge stroke of their associated pump pistons, (see valves 118 and 119) the lands of the gate control valve direct incoming pressure fluid into the forward ends of the associated gate cylinders 104 through ducts 133 to cause retraction of the gate valves to their charging positions. Fluid exhausting into ducts 134 from the rear of the cylinders 104 at such times is directed through the gate control valves to the left hand reservoir ports 131.

Extension of each gate valve to a discharging position such as occupied by valve V1, effects shifting of the spool 124 of its associated cylinder control valve to the right to an operating position such as occupied by the valve 120. Similarly, retraction of the gate valves to charging positions such as occupied by valves V2 and V3, effects shifting of the spools of their associated cylinder control valves to the left to operating positions such as occupied by valves 121 and 122.

The cylinder control valves 120, 121 and 122 are identical. Each has a pair of supply ports p1 and p2 which connect with the outlets of pumps P1 and P2, respectively, a pump cylinder port 136 that is connected to the front end of its associated pump actuating cylinder by a duct 137, and a reservoir port 138 that is communicated with the pump cylinder port 136 only in the right hand position of the spool in the cylinder control valve (see valve 120). In addition, each of the cylinder control valves 120, 121 and 122 has a pair of outlets 139 and 140 which are paired with the supply ports p1 and p2, respectively, of the valve in such a way that each is communicated with its associated supply port in only the right hand position of the valve spool, as is the case with the valve 120 in the diagram.

Finally, each of the cylinder control valves is provided with an inlet port 141, which is communicated with the cylinder port 136 of the valve only when its spool has been shifted to the left to an operating position such as occupied by valves 121 and 122 in the diagram.

A duct 142 connects the inlet 141 of valve 120 with the outlet 139 of valve 122, and also through a branch 143 of duct 142 with the outlet 139 of valve 121, so that pressure fluid to effect the charging stroke of actuating cylinder 109 for pump cylinder C1 can be obtained from either of cylinder control valves 121 or 122.

Pressure fluid to effect the charging stroke of the actuating cylinder 110 for pump cylinder C2 can be obtained from either of the cylinder control valves 120 or 122. For this purpose, the inlet 141 of valve 121 connects with a duct 144 that has one branch 145 in communication with the outlet 139 of valve 120, and a second branch 146 in communication with the outlet 140 of valve 122.

Similarly, pressure fluid to effect the charging stroke of the actuating cylinder 111 for pump cylinder C3 can be obtained from either of the cylinder control valves 120 or 121. Thus, the inlet 141 of valve 122 is communicated by a duct 147 with the outlet 140 of valve 120, and by a branch 148 of duct 147 with the outlet 140 of valve 121.

Referring to FIGURE 13, the piston in cylinder C1 is shown nearing the end of its discharge stroke, the piston in cylinder C2 nearing the end of its charging stroke, and the piston in cylinder C3 about half way through its charging stroke. Under these conditions, pump P1 is supplying pressure fluid to the actuating cylinder 110 of the charging pump cylinder C2 through ports p1 and 139 of the control valve 120 for the discharging cylinder C1, ducts 144 and 145, and ports 136 and 141 of cylinder control valve 121; and pump P2 is supplying fluid under pressure to the actuating cylinder 111 of charging pump cylinder C3 through ports p2 and 140 of control valve 120 for the discharging cylinder C1, duct 147, and ports 136 and 141 of valve 122. Since the output rates of pumps P1 and P2 are equal, the pistons in cylinders C2 and C3 will be propelled rearwardly in their charging strokes at the same rate of speed, but since their actuating cylinders 110 and 111 respectively, are exhausting into the rear of the actuating cylinder 109, the piston in cylinder C1 will be traveling forwardly in its discharge stroke at substantially twice the retraction speed of the pistons in cylinders C2 and C3.

During the discharge of cylinder C1, fluid exhausting from the front of its actuating cylinder 109 flows through duct 137 and the then communicated ports 136 and 138 of cylinder control valve 120 to the reservoir.

The piston 99 in cylinder C1 will reach the end of its discharge stroke at about the same time that the piston 99 in cylinder C2 reaches the end of its charging stroke. This causes the positions of the spools of the gate control valves 117 and 118 to be reversed, as seen in FIGURE 14, to effect retraction of the gate valve V1 to its charging position, and extension of gate valve V2 to its discharging position. The piston in cylinder C1 cannot begin its charging stroke until such reversal of gate valves V1 and V2 has taken place, for the reversal of the spools of cylinder control valves 120 and 121 which is effected thereby, is relied upon to bring pressure fluid from pump P1 to cylinder 109. This is accomplished through ports p1 and 139 of valve 121, ducts 143 and 142 leading to inlet port 141 of valve 120, cylinder port 136 of this valve, and duct 137 which connects with the forward end of actuating cylinder 109.

The actuating cylinder 111 for pump cylinder C3 continues to be fed with fluid from pump P2, although it is now supplied with pressure fluid from the ports p2 and 140 of cylinder control valve 121, whereas before (FIGURE 13) it was supplied with pressure fluid through ports p2 and 140 of valve 120. The actuating cylinder 110 for pump cylinder C2 is shown receiving the fluid exhausting from the rear of cylinders C1 and C3, which are both charging in the condition illustrated in FIGURE 14.

In FIGURE 14, the pistons in cylinders C2 and C3 have also been shown about to reach the ends of their discharge and charging strokes, respectively, and when that occurs, the spools of their respective gate control valves 118 and 119 will be moved to the positions thereof seen in FIGURE 15, to ready cylinder C3 for discharge and cylinder C2 for charging. Cylinder C1 will continue to charge, and is shown with its piston nearing the end of its charging stroke in FIGURE 15, while the discharge of cylinder C3 is nearing completion.

With the components in their positions seen in FIGURE 15, the exhausting fluid from the actuating cylinders of both charging cylinders C1 and C2 is being fed into the rear of the actuating cylinder for the discharging pump cylinder C3. When the pistons in cylinders C1 and C3 reach the ends of their strokes, they effect reversal of their associated gate control valves, and such shifting of the spools of the latter accordingly reverses the positions of their gate valves, and hence the spools in the associated cylinder control valves, to again bring the system to its condition depicted in FIGURE 13. Consequently, one complete cycle of the pump will have been effected in the manner described, during which the pistons in each of cylinders C1, C2 and C3 will in turn be carried through a full discharge stroke while the remaining pistons will have been carried through full charging strokes, at half the speed of the discharge stroke, and in different phases of their charging strokes. The control valve for the discharging cylinder, in each case, completes the hydraulic circuit from pump P1 to the drive cylinder for one of the charging cylinders through its control valve, and completes the hydraulic circuit from pump P2 to the drive cylinder of the other charging pump cylinder through the control valve of the latter.

FIGURE 16 is a diagram showing a somewhat different hydraulic control system that features a single pump P, cylinder control valves 151, 152 and 153 for pump cylinders C1, C2 and C3, respectively, for directing pump fluid into the rear of each pump actuating cylinder in turn to effect the discharge stroke of the associated pump cylinder, and ducting 154 connecting the forward ends of all the pump actuating cylinders with one another through a flow divider 155, to effect the charging strokes of the remaining pump cylinders at one half the speed of the discharging cylinder.

In this case, also, gate control valves 156, 157 and 158, actuated by the drivers 125 of the pump actuating cylinders 109, 110 and 111, are provided to control extension and retraction of the gate valves V1, V2 and V3, respectively. The spools 124 of the cylinder control valves 151, 152 and 153 are connected to the pistons of the gate actuating cylinders 104, to be driven back and forth between the two operative positions of the cylinder control valves is consequence of extension and retraction of the gate valves V1, V2 and V3, respectively. In this case, however, the spool of each of the cylinder control valves has but two lands to enable a single outlet 160, that leads to the rear of its associated pump actuating cylinder, to be selectively communicated with either a reservoir port 161 when its gate valve is moved to retracted or charging position, or a supply port 162 that is connected with the outlet of the single pump P. The outlet 160 is communicated with the supply port 162 as a consequence of actuation of the associated gate valve to its extended, or cylinder discharging position.

Hence, during operation of the system shown in FIGURE 16, pressure fluid will be directed into the rear of the actuating cylinder of each pump cylinder in turn, to produce a discharge stroke of the piston in that cylinder, while the pistons in the remaining pump cylinders will be driven rearwardly along their charging strokes, in different phases thereof, and at a slower speed, in consequence of the flow of pressure fluid exhausting from the actuating cylinder of the discharging pump cylinder in equal quantities into the front ends of the actuating cylinders for said remaining pump cylinders. As before, the gate control valve for each pump cylinder is actuated whenever a pump piston reaches the end of either a charging or a discharging stroke to effect repositioning of the gate valve. Pressure fluid cannot be supplied to or exhausted from any of the pump actuating cylinders until the control valve for that cylinder has been shifted by the associated gate valve. This assures that the gate valves will be in their proper positions before the pistons in their associated pump cylinders start either a charging or a discharging stroke.

From the foregoing description, together with the accompanying drawings, it will be readily apparent to those skilled in the art that this invention provides a vastly improved pump for handling semi-liquid materials such as freshly mixed concrete and the like, and which features output rates that can greatly exceed those of conventional pumps.

What I claim as my invention is:

1. Pumping apparatus wherein the material to be pumped is charged into the pump in consequence of rearward travel of a piston in a cylinder and discharged from the pump in consequence of forward travel of said piston, said apparatus being characterized by: the fact that the apparatus comprises at least three such cylinders, each having a piston reciprocable therein; drive means connected with each piston and operable to effect forward travel thereof at one rate of speed; drive means connected with each piston and operable to effect rearward travel of the piston at a rate so related to that of its forward travel that the time interval required to move the piston rearwardly through its full charging stroke is substantially equal to the time interval required to move it through its full discharging stroke multiplied by one less than the number of cylinders of which the pumping apparatus is comprised; and means synchronizing the operation of said drive means for the pistons to produce forward travel of each piston in turn while concomitantly producing rearward travel of the remaining pistons through different fractions of their charging strokes, to thus at all times assure travel of one piston in a discharging direction and travel of the others more slowly in charging directions.

2. Pumping apparatus wherein the material to be pumped is charged into a cylinder through a valve controlled inlet port in consequence of rearward travel of a piston in the cylinder and is discharged from the cylinder through a valve controlled discharge port in consequence of forward travel of said piston, characterized by: the fact that said apparatus comprises at least three such cylinders each having a piston reciprocable therein; drive means connected with each piston and operable to propel the piston rearwardly in its charging stroke at one rate; drive means connected with each piston and operable to propel the same forwardly in its discharging stroke at a rate which is substantially equal to the rate of its rearward charging stroke multipied by one less than the number of cylinders of which the pumping apparatus is comprised; and means synchronizing the operation of said drive means for the pistons to produce forward travel of each piston in turn while concomitantly producing rearward travel of the remaining pistons through different fractions of their charging strokes, to thus at all times assure travel of one piston in a discharging direction and travel of the others more slowly in charging directions.

3. In a pump for concrete and other semi-fluid materials of comparable consistency: at least three pump cylinders each having front and rear ends, and a piston reciprocable therein between retracted and extended positions; feed passage means communicating with each cylinder, through which materials to be pumped flow to each cylinder in consequence of retraction of the piston in said cylinder; discharge passage means communicating with each cylinder, and through which materials flow in consequence of extension of the piston in said cylinder; inlet valve means for each cylinder, movable to and from a closed position blocking transfer of material between the cylinder and said feed passage means therefor; outlet valve means for each cylinder, movable to and from a closed position blocking transfer of material between the cylinder and said discharge passage means therefor; means for moving said valve means in such synchronization with reciprocation of the pistons that the inlet valve means of each cylinder will be in closed position substantially only during the extension strokes of the piston in said cylinder while the outlet valve means of each cylinder will be in closed position substantially only during the retraction strokes of the piston in said cylinder; drive means connected with each piston and operable to effect retraction of the piston at one velocity; drive means connected with each piston and operable to effect extension of the piston at a velocity which is substantially equal to the velocity of piston retraction multiplied by one less than the number of cylinders of which the pump is comprised; and means synchronizing the operation of said drive means for the pistons to produce extension of each piston in turn while concomitantly producing retraction of the remaining pistons through different fractions of their retraction strokes.

4. The pumping apparatus of claim 3, further characterized by: the fact that said piston drive means comprises double acting fluid pressure operated cylinders, one for each pump cylinder and each having a port in one end into which pressure fluid may be admitted to effect one of said strokes of its associated pump piston, and having another port in its opposite end through which pressure fluid is exhausted during said one stroke of its associated pump piston; and by the fact that said other ports are connected together in substantially closed circuit relation.

5. Pumping apparatus wherein the material to be pumped is charged into the pump in consequence of rearward travel of a piston in a cylinder and discharged from the pump in consequence of forward travel of said piston, said apparatus being characterized by: the fact that the apparatus comprises at least three such cylinders, each having a piston reciprocable fore and aft therein; a fluid pressure operated drive cylinder for each pump cylinder, mounted in fixed relation thereto, each of said drive cylinders having a piston reciprocable therein and having ports in its opposite end portions; means drivingly connecting the piston of each pump cylinder with the piston of its drive cylinder, whereby pressure fluid fed into the front port of each drive cylinder effects the charging stroke of its associated pump piston and pressure fluid flowing into the rear port of each drive cylinder effects the discharge stroke of its associated pump piston; means for effecting travel of each pump piston in turn through its discharge stroke and for simultaneously effecting rearward travel of the remaining pump pistons through different fractions of their charging strokes, comprising a two position control valve for each drive cylinder operable in one position thereof to direct pressure fluid into the front port of its drive cylinder and in the other position thereof to provide for free exhaust of pressure fluid from said front port of its drive cylinder, and means for effecting reversal of the position of each of said control valves in consequence of travel of its associated pump piston to the end of each stroke thereof; and duct means connecting the rear ports of all of said drive cylinders in substantially closed circuit relation so that fluid exhausting from the rear ports of drive cylinders which are effecting charging strokes of their respective pump pistons is fed into the rear port of the one remaining drive cylinder to effect the discharge stroke of the pump piston associated with said remaining drive cylinder.

6. Pumping apparatus comprising: at least three pump cylinders, each having a piston reciprocable therein; means providing a feed passage for each cylinder through which material may flow to charge the cylinder in consequence of retraction of the piston therein; means providing a discharge passage for each cylinder through which material may be expelled from the cylinder in consequence of extension of the piston therein; inlet valve means for said cylinders, movable into and out of positions at which the inlet valve means blocks the feed passages to prevent transfer of materials between them and the cylinders with which they communicate; outlet valve means for said cylinders, movable into and out of positions at which the outlet valve means blocks the discharge passages to prevent the transfer of materials between them and the cylinders with which they communicate; piston reciprocating means connected with said pistons and operable to effect extension of each piston in turn while concurrently effecting retraction of the remaining pistons through different fractions of their retraction strokes; valve drive means connected with said inlet and outlet valve means and operable to move the same into and out of said passage blocking positions thereof; and sequence control means cooperating with the piston reciprocating and valve drive means for so coordinating the movements of the inlet and outlet valve means with reciprocation of the pistons that the inlet valve means associated with each pump cylinder will be in said passage blocking position thereof during the extension stroke of the piston in said cylinder, and the outlet valve means associated with each pump cylinder will be in said passage blocking position thereof during the retraction stroke of the piston in said cylinder.

7. The pumping apparatus of claim 6, further characterized by: the fact that said feed passages have inlet portions, the mouths of which open into the bottom of a material receiving chamber common to the feed passages, the mouths of said feed passages being substantially equispaced from one another and substantially equidistant from a common center; the fact that said inlet valve means comprises a sector-like disc which is mounted in the bottom of said chamber for edgewise rotation about an axis which passes through said common center, and is shaped to cover the mouth of each feed passage in turn upon rotation of the disc in one direction to a number of different stations corresponding to the number of feed passages, and to uncover the mouths of the remaining feed passages at each of said stations; and wherein said valve drive means rotates said inlet valve disc in said direction successively to said different stations.

8. The pumping apparatus of claim 6, further characterized by: the fact that said discharge passages have mouths which open through the bottom of a well that communicates with a common collecting chamber, the mouths of said discharge passages being substantially equidistant from one another and from a common center; the fact that said outlet valve means comprises a sector-like disc which is mounted in the bottom of said well for edgewise rotation about an axis which passes through said common center, and is shaped to uncover the mouth of each discharge passage in turn upon rotation of the disc in one direction to a number of different stations corresponding to the number of discharge passages, and to cover the mouths of the remaining discharge passages at each of said stations; and wherein said valve drive means rotates said outlet valve disc in said direction successively to said different stations.

9. The pumping apparatus of claim 6, wherein said sequence control means comprises means associated with each pump cylinder, having a movable control element operatively connected with the piston of said pump cylinder, and operable to effect movement of the inlet valve means for each pump cylinder to the passage blocking position thereof in consequence of travel of the piston in said cylinder to its retracted position, and to effect movement of the outlet valve means for said cylinder to the passage blocking position thereof in consequence of travel of the piston in said cylinder to its extended position.

10. The pumping apparatus of claim 9, wherein said sequence control means further comprises means associated with each pump cylinder having a movable control element operatively connected with the valve means for said cylinder, for controlling operation of the piston reciprocating means, and operable to effect extension of the piston in each pump cylinder in consequence of actuation of the inlet valve means for said cylinder to the passage blocking position thereof and to effect retraction of the piston in each pump cylinder in consequence of actuation of the outlet valve means for said cylinder to the passage blocking position thereof.

11. In apparatus for pumping semi-liquid materials such as freshly mixed concrete; a pump cylinder having an open end and a piston reciprocable therein toward and from the open end of the cylinder; a feed passage for the cylinder; a discharge passage for the cylinder; said feed and discharge passages communicating at a common zone adjacent to said open end of the cylinder and diverging from said zone so as to dispose portions thereof in adjoining relation; a combination inlet and outlet gate valve for the cylinder, extending across said adjoining passage portions and edgewise movable from an extended position closing the feed passage and opening the discharge passage, to a retracted position closing the discharge passage and opening the feed passage; valve shifting means for moving the valve back and forth from either of said positions to the other thereof; gate control means having an element which is movable to a first position to render the valve shifting means operative to effect extension of the gate valve, and movable to a second position to render the valve shifting means operative to effect retraction of the gate valve; piston drive means connected with said piston for effecting extension and retraction of the same; control means for the piston drive means having an element which is movable to a first position to render the piston drive means operative to effect extension of the piston and movable to a second position to render the piston drive means operative to effect retraction of the piston; means connecting said element of the control means for the piston drive means with the gate valve to cause motion of the piston control element to said first position thereof in consequence of extension of the gate valve, and to cause motion of the piston control element to said second position thereof in consequence of retraction of the gate valve; and means connecting said element of the gate control means with said piston to cause motion of the gate control element to said first position thereof in consequence of retraction of the piston and to cause motion of the gate control element to said second position thereof in consequence of extension of the piston.

12. In pumping apparatus for pumping semi-liquid materials such as freshly mixed concrete: three pump cylinders each having a piston which is retractable to effect charging of the cylinder and extensible to effect discharging of the cylinder; a feed passage for each cylinder, to supply materials to be pumped to the cylinder; a discharge passage for each cylinder, to receive materials discharged from the cylinder; inlet valve means for each pump cylinder, movable to and from a position blocking the feed passage for said cylinder; outlet valve means for each pump cylinder movable to and from a position blocking the discharge passage for said cylinder;

means connected with the inlet valve means for actuating the same; means connected with the outlet valve means for actuating the same; piston actuating means connected with the pistons of the pump cylinders for effecting extension and retraction thereof; and means for coordinating the operation of said valve and piston actuating means so as to effect extension of the piston of each pump cylinder in turn and concurrent retraction of the pistons in the remaining pump cylinders, including means for rendering the piston actuating means of each cylinder operative to effect extension of the piston therein in consequence of movement of its associated valve means to positions blocking the feed passage for said cylinder and clearing the discharge passage for said cylinder, and to effect retraction of the piston in said cylinder in consequence of movement of its associated valve means to positions clearing the feed passage for said cylinder and blocking the discharge passage for said cylinder, said last named means further including means for rendering the actuating means for the valve means associated with each pump cylinder operative to effect blocking of the discharge passage and clearing of the feed passage for said cylinder in consequence of extension of the piston in said cylinder, and to effect blocking of the feed passage and clearing of the discharge passage in consequence of retraction of the piston in said cylinder.

13. The pumping apparatus of claim 12, wherein: said inlet and outlet valve actuating means comprises a fluid pressure responsive drive cylinder for the valve means associated with each pump cylinder; the piston actuating means comprises a fluid pressure responsive drive cylinder for the piston of each pump cylinder; and said coordinating means comprises control valve means for the inlet and outlet valve drive cylinders associated with each pump cylinder, operated by the piston in said pump cylinder so as to effect reversal of the positions of its associated inlet and outlet valve means in consequence of reversal of the direction of travel of the piston in said pump cylinder, and control valve means for the piston drive cylinder of each pump cylinder, operated by its associated inlet and outlet valve means so as to effect reversal of the direction of travel of the piston in said pump cylinder in consequence of reversal of the positions of its associated inlet and outlet valve means.

14. The pumping apparatus of claim 13, wherein fluid pressure is supplied to said drive cylinders from a pair of pumps having equal delivery rates; and wherein the control valve means for the piston drive cylinders are so communicated with one another and with their respective drive cylinders and said two pumps, that each is adapted to make pressure fluid from said pumps separately available to the piston drive cylinders of two pump cylinders to retract the pistons therein while the piston in the third pump cylinder is moving through its extension stroke.

15. The pumping apparatus of claim 14, wherein the piston drive cylinders are so communicated with one another that pressure fluid exhausting from any two of them during the retraction strokes of their respective pump pistons is conducted into the third piston drive cylinder to effect extension of its associated pump piston.

16. Apparatus for pumping semi-liquid materials such as freshly mixed concrete, wherein the material to be pumped is charged into a pump cylinder through a valve controlled feed passage in consequence of retraction of a piston in the cylinder and is discharged from the cylinder through a valve controlled discharge passage in consequence of extension of said piston, characterized by: the fact that said apparatus comprises at least three such pump cylinders each having a piston reciprocable therein; means for imparting extension and retraction motions to said pistons comprising a double acting fluid pressure operated drive cylinder for each pump cylinder, having a piston drivingly connected with the piston of the pump cylinder, and having a piston retraction port in one end and a piston extension port in its opposite end; and an operating circuit for said drive cylinders for effecting extension of each pump piston in turn and concurrent retraction of the remaining pump pistons, comprising a single source of pressure fluid, a control valve for each drive cylinder operable to selectively connect the piston extension port of its drive cylinder with either an exhaust port in the control valve or the source of fluid pressure, duct means connecting the piston retraction ports of the drive cylinders in a substantially closed circuit and having flow divider means therein by which fluid exhausting from the piston retraction port of each drive cylinder in turn during operation thereof to effect extension of its associated pump piston is directed in equal quantities into the piston retraction ports of the remaining drive cylinders to effect retraction of their respective pump pistons.

*17. A positive displacement pump for pumping slow flowing semi-liquid materials, characterized by the following: a pumping cylinder which is open at one end; supply means communicating with said end of the cylinder and from which material to be pumped can be charged into the cylinder; delivery means communicating with said end of the cylinder to receive materials discharged therefrom; a piston reciprocable within the cylinder; valve mechanism movable from one to the other of a pair of operating positions to selectively communicate either the supply or the discharge means with said end of the cylinder; drive means for shifting said valve mechanism from one operating position to the other thereof; positive acting differential drive means connected with the piston and operable to effect low charging motion of the piston away from said end of the cylinder and controlled faster discharging motion of the piston toward said end of the cylinder; and means synchronizing the operation of said piston drive means with that of the valve drive means to assure that the valve mechanism will be in its position communicating the supply means with said end of the cylinder during charging motion of the piston, and to assure that the valve mechanism will be in its position communicating the delivery means with said end of the cylinder during the discharge motion of the piston.*

*18. Pumping apparatus wherein the material to be pumped is charged into a pumping chamber in consequence of retracting movement of a pumping member in the chamber and discharged from the pump in consequence of advancing movement of said pumping member, said apparatus being characterized by the following: that the apparatus comprises more than two pumping chambers each having a pumping member mounted therein for advancing and retracting movement; differential drive means connected with each pumping member, operable to effect charging movement thereof at a low rate of speed and to effect positive discharging movement thereof at a controlled higher rate of speed; and means synchronizing the operation of said differential drive means for the pumping members to separately produce controlled discharging movement of each pumping member in turn at said higher rate of speed, while concurrently producing charging movement of at least one other pumping member at said low rate of speed.*

*19. Pumping apparatus wherein the material to be pumped is charged into the pump in consequence of retracting motion of a pumping member in a chamber and discharged from the pump in consequence of advancing motion of said pumping member, said apparatus being characterized by: the fact that the apparatus comprises more than two such chambers, each having a reciprocable pumping member therein; drive means connected with each pumping member and operable to effect positive and controlled discharging movement thereof at one rate of speed; drive means connected with each pumping member and operable to effect positive charging movement thereof at a controlled speed substantially lower than that at which the pumping member is advanced;*

*and means synchronizing the operation of said drive means for the pumping members to produce controlled discharging motion of each pumping member in turn while concurrently producing controlled charging motion of two other pumping members to thus assure simultaneous charging motion of two pumping members at said lower speed while a third pumping member is moving in a discharging direction at a greater rate of speed.*

References Cited in the file of this patent or the original patent

UNITED STATES PATENTS 2,212,667 Mayer ---------- Aug. 27, 1940

FOREIGN PATENTS 766,371 France ---------- Apr. 16, 1934